United States Patent [19]

Maloberti

[11] Patent Number: 5,108,133

[45] Date of Patent: * Apr. 28, 1992

[54] CONNECTOR WITH QUICK RELEASE UNDER LOAD

[76] Inventor: René Maloberti, 20, rue Dagobert, 94130 Nogent, France

[*] Notice: The portion of the term of this patent subsequent to Feb. 20, 2007 has been disclaimed.

[21] Appl. No.: 453,839

[22] Filed: Jan. 17, 1990

Related U.S. Application Data

[63] Continuation of Ser. No. 73,656, Jul. 15, 1987, Pat. No. 4,902,046.

[30] Foreign Application Priority Data

Jul. 16, 1986 [FR] France ................. 86 10352

[51] Int. Cl.$^5$ ............................................. F16L 35/05
[52] U.S. Cl. ...................................... 285/34; 285/367;
285/420; 285/363; 285/920; 411/433
[58] Field of Search ................. 285/2, 33, 34, 35, 920,
285/363, 405, 18, 367, 420, 387, 388; 411/433, 434

[56] References Cited

U.S. PATENT DOCUMENTS

| | | | |
|---|---|---|---|
| 1,062,000 | 5/1913 | Hahn | 411/433 |
| 2,165,656 | 7/1939 | Ryan | 285/2 X |
| 2,421,807 | 6/1947 | Richey et al. | 411/433 X |
| 2,705,652 | 4/1955 | Kasier . | |
| 2,748,647 | 6/1956 | Notturno . | |
| 2,809,584 | 10/1957 | Smith | 285/2 X |
| 3,109,216 | 11/1963 | Brown | 285/2 X |
| 3,120,149 | 2/1964 | Dickie | 411/433 |
| 3,204,515 | 9/1965 | Dickie et al. | 411/434 |
| 3,334,536 | 6/1967 | Armstrong | 285/34 X |
| 3,659,877 | 5/1972 | Kubasta . | |
| 3,926,090 | 12/1975 | Bunker . | |
| 4,082,468 | 4/1978 | Von Bose . | |
| 4,159,132 | 6/1979 | Hitz . | |
| 4,347,715 | 9/1982 | Corman | 285/2 X |
| 4,424,988 | 1/1986 | Cowx | 285/2 |
| 4,688,827 | 8/1987 | Bassett | 285/2 |
| 4,902,046 | 2/1990 | Maloberti | 285/34 |

FOREIGN PATENT DOCUMENTS

| | | |
|---|---|---|
| 80136 | 3/1983 | European Pat. Off. . |
| 1184157 | 12/1964 | Fed. Rep. of Germany . |
| 2333040 | 9/1975 | Fed. Rep. of Germany . |
| 1332745 | 1/1963 | France . |
| 4534329 | 9/1965 | Japan ............ 411/433 |
| 2051993 | 1/1981 | United Kingdom ...... 285/2 |

OTHER PUBLICATIONS

French Search Report No. FR 86 10 352 FA 381365, Mar. 30, 1987.

Primary Examiner—Dave W. Arola
Attorney, Agent, or Firm—Hoffman, Wasson and Gitler

[57] ABSTRACT

Connector for quick release under load, particularly for pipes for transporting fluids such as hydrocarbons, characterized by the fact that it comprises, between two opposite structural elements (1, 2) or between two parts of an element connecting the two structural elements, at least a connecting device comprising an internally shaped annular ring (7) consisting of at least two segments of complementary shape, a rod (4) equipped with an outside shaping corresponding to the inside shaping of the ring, engaged internally in said ring and extending over at least a part of its height and an annular sleeve (6) engaged on said nut and able to be moved axially in relation to it under the effect of an actuating element, such as a cylinder (12) acting directly or indirectly on said sleeve.

25 Claims, 6 Drawing Sheets

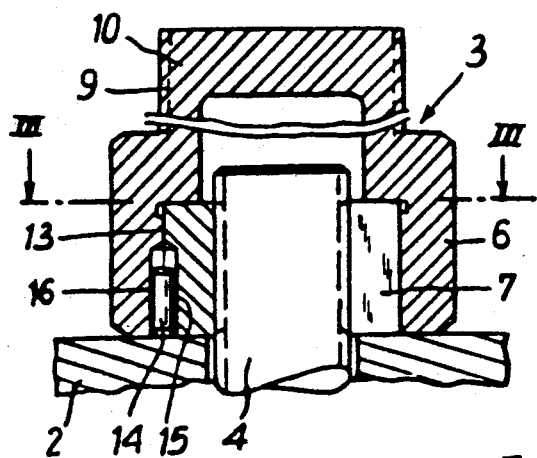
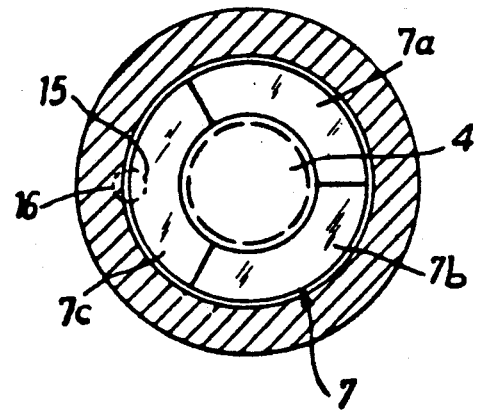
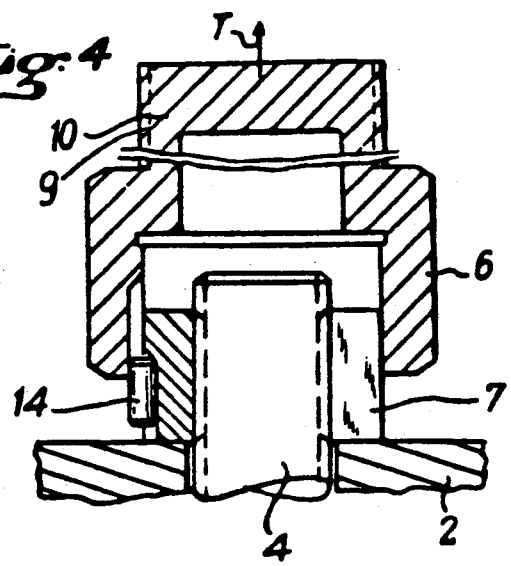
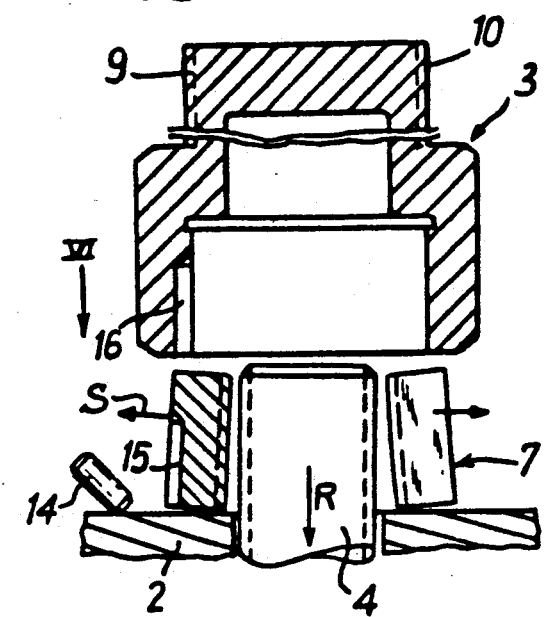
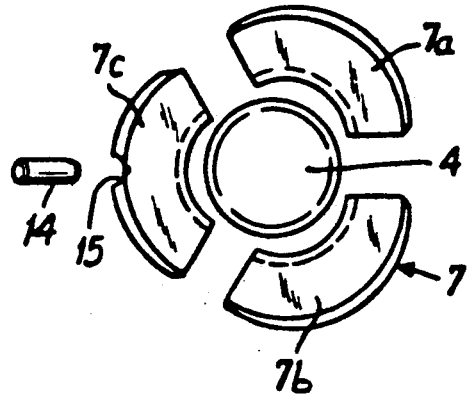

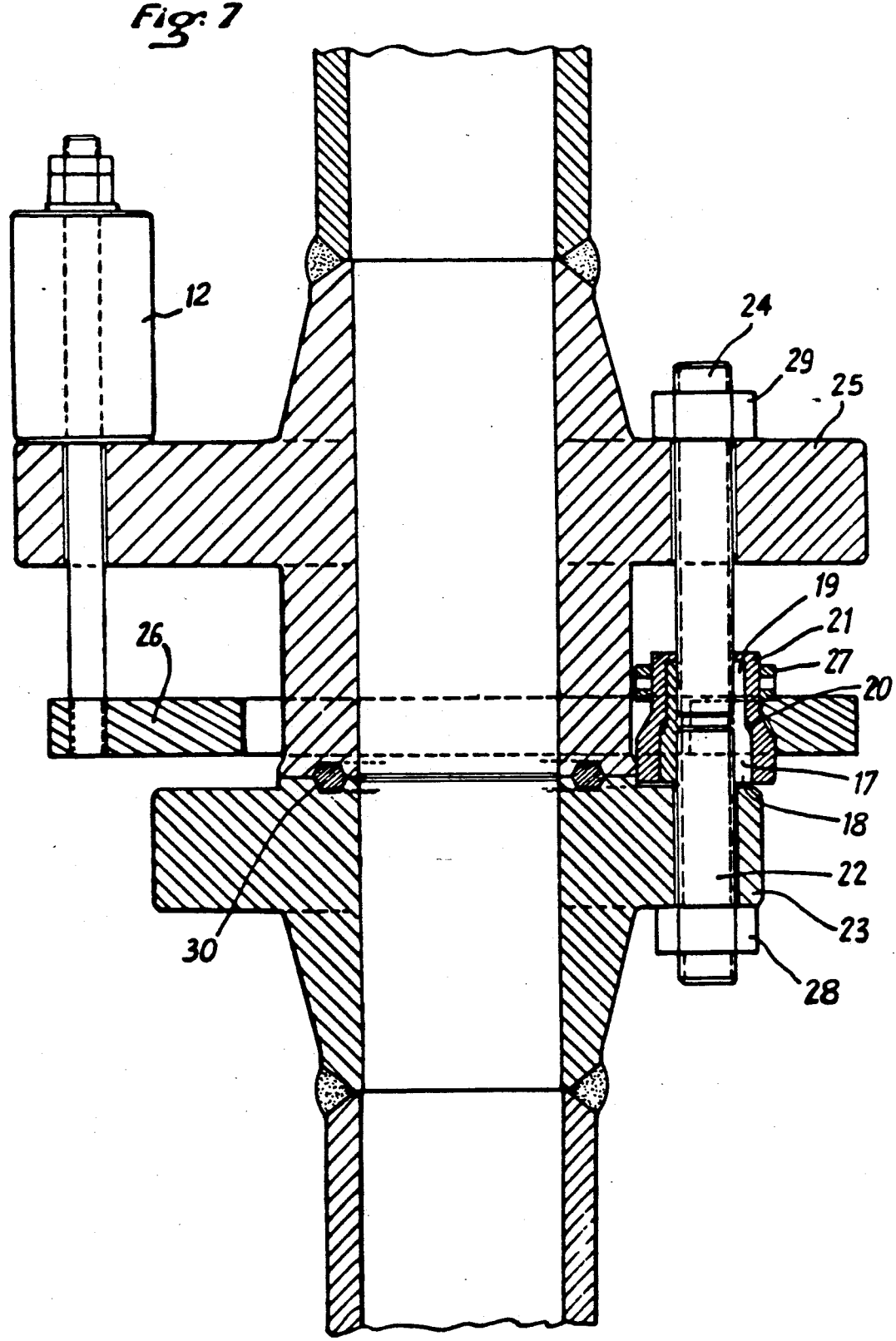

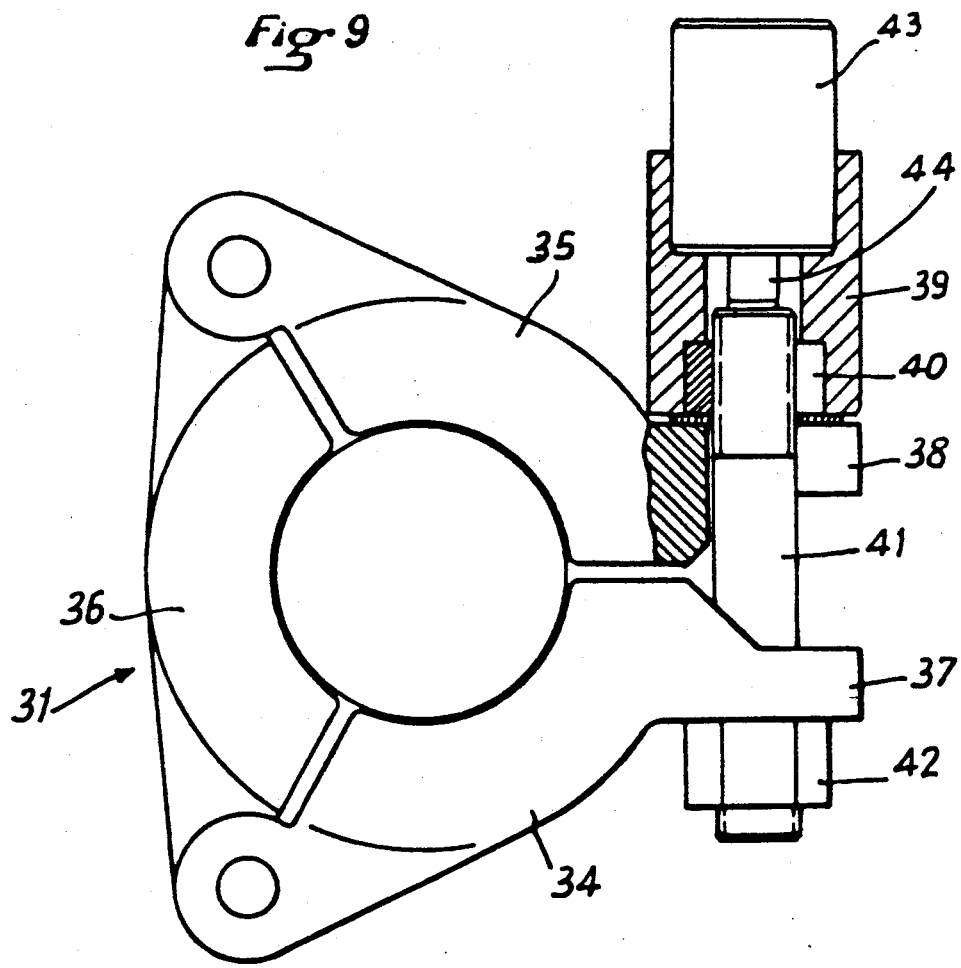
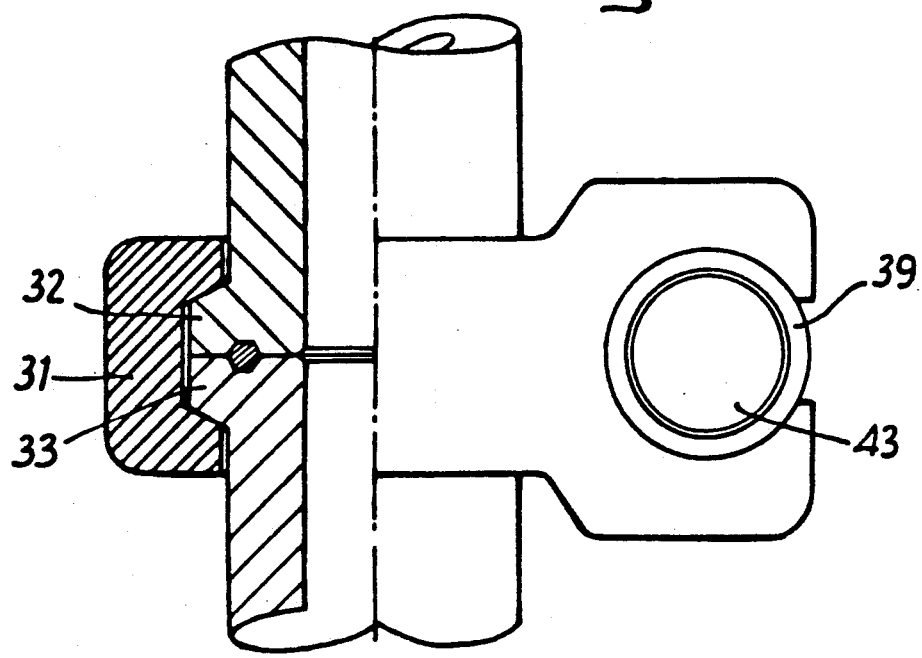

CONNECTOR WITH QUICK RELEASE UNDER LOAD

This application is a continuation of copending application Ser. No. 073,656 filed Jul. 15, 1987 now U.S. Pat. No. 4,902,046 issued Feb. 20, 1990.

This invention relates to a safety connector with quick release under load of structural elements such as tubular pipes for transporting products dangerous to the environment, particularly hydrocarbons.

The connector according to the invention can be used in all applications where it is necessary to be able to separate, in an almost instantaneous manner, connected structural elements under heavy load, in particular tubular pipes for transfer of hydrocarbons, that are kept under tension.

Such a connector can, in particular, be used in the device described in French patent 76 33086 of the applicant company to connect two structures using a flexible tubular pipe kept under tension assuring both the connection between the structures and the transfer of fluid between them.

Below, reference will be made to the structural elements as being tubular pipes, but it should be understood that this definition is in no way limiting and that the invention can also be put into practice with structural elements such as cables or pipe banks.

According to U.S. Pat. No. 3,659,877, a connector is known for tubular pipes that comprises between two flanges opposite a plurality of connecting devices each made up of a threaded rod equipped with a reduced section intended to form a rupture zone, the threaded rods each being held by nuts on the corresponding flanges.

Because of the reduction of section of each of the threaded rods, the allowable load of the connector made is reduced and disconnection during an overload is not absolutely reliable to the extent that it is not possible to guarantee a simultaneous sectioning of all the rods providing the connection.

BACKGROUND OF THE INVENTION

This invention has as its object to make a quick-release connector that makes it possible to achieve, in a particularly reliable way, a quick disconnection between two structures, even when a very heavy load is applied on the connecting devices, this load according to the invention being able to be close to the breaking load of the elements that make up the constituent elements of the connecting devices, i.e., in practice on the order of several tens of tons.

The connector for quick release under load according to the invention is characterized essentially by the fact that it comprises, located between two opposite structural elements or between two parts of an element connecting the two structural elements, at least one connecting device comprising an internally shaped annular ring and consisting of at least two segments of complementary shape, a rod equipped with an outside shaping corresponding to the inside shaping of the ring, engaged internally in said ring and extending over at least a part of its height and an annular sleeve engaged on said ring and able to be moved axially in relation to it under the effect of an actuating element such as a cylinder acting directly or indirectly on said sleeve.

The shapings made on the rod and the ring are preferably threads, the ring then being a nut in which the threaded rod is screwed internally, if necessary after the sleeve has been engaged on the ring.

As a variant, the shapings can consist of denticulations, in which case the constituent segments of the ring are engaged on the rod, then kept in place thanks to the sleeve.

It is understood that, according to the invention, when an axial force is exerted in a direction tending to separate the sleeve from the rod on which the ring is engaged, the sleeve slides on the periphery of the ring until its end arrives in the vicinity of the end of the ring then causing a separation of the segments that make up this latter.

Preferably, the annular sleeve is shrink-fitted on the ring.

As a variant, it is possible to provide a slight assembly play. The contact surface between the ring and the sleeve is preferably cylindrical but as a variant can be slightly conical in the direction opposite that which would cause the self-shrinking of the sleeve on the ring because of the locking of the ring on the rod.

In a particular embodiment, the ring consists of three equal annular segments. In a particular embodiment using a threaded rod and a nut and intended to be used in the case where it is desired, during positioning, to achieve a locking between the nut and the threaded rod by rotation of the sleeve engaged on the nut, there is provided on the inside wall of the sleeve and the outside wall of at least one of the segments of the nut, at least one groove of semicircular section, a cylindrical pin being housed in the grooves opposite to assure the transmission of a locking torque. This locking torque can, for example, be applied by using a tool that is engaged on a part of the sleeve made, for example, hexagonal.

The device according to the invention can further comprise a second rod that is shaped, threaded or denticulated, engaged in the ring and solid with the structural element with which the sleeve is made solid. Thus, there are two opposite shaped rods engaged in the ring and each solid with a structural element.

In an advantageous embodiment, particularly to reduce the travel of the sleeve before separation from the segments of the ring, the latter exhibits an outside surface in stages comprising at least one set-back, the sleeve exhibiting a corresponding inner surface. Thanks to this embodiment, the separation from the segments of the ring is obtained as soon as the sleeve has traveled a length corresponding to only one part of the length of the ring, namely the distance separating the end of larger diameter of the ring from the zone of the set-back.

In a particular embodiment of the invention, the threaded rod of each connecting device is made solid with an annular flange of a structural element, the sleeve being made solid preferably with a mobile annular plate whose movement under the effect of the actuating element such as a cylinder causes, as indicated above, the necessary movement of the sleeves engaged in the rings having corresponding segments and the desired disconnection.

In another embodiment of the connector according to the invention, there is provided a single connecting device whose shaped rod is threaded and tubular, and constitutes one of the connected pipes. In this case, disconnection is advantageously obtained by movement of the sleeve surrounding the pipes connected under the effect of a cylinder pressing on a flange solid with the sleeve.

BRIEF DESCRIPTION OF THE DRAWINGS

To understand the invention better, particular embodiments will now be described by way of nonlimiting examples with reference to the accompanying drawing in which:

FIG. 2 is a diagrammatic view in section of a connecting device of a type that can be used in the connector of FIG. 1, in assembled position, FIG. 3 is a view in section along III—III of FIG. 2, FIGS. 4 and 5 are views similar to FIG. 2, showing the connecting device during two separation phases, FIG. 6 is a view in the direction of arrow VI of FIG. 5 illustrating the separation of the segments of the nut, FIG. 7 illustrates a connector of tubular pipes according to a second embodiment, FIGS. 9 and 10 are views respectively in cross section and in elevation of another connector embodiment according to the invention, FIG. 11 further illustrates another connector embodiment of tubular pipes.

DESCRIPTION OF THE PREFERRED EMBODIMENT

Figure 1:
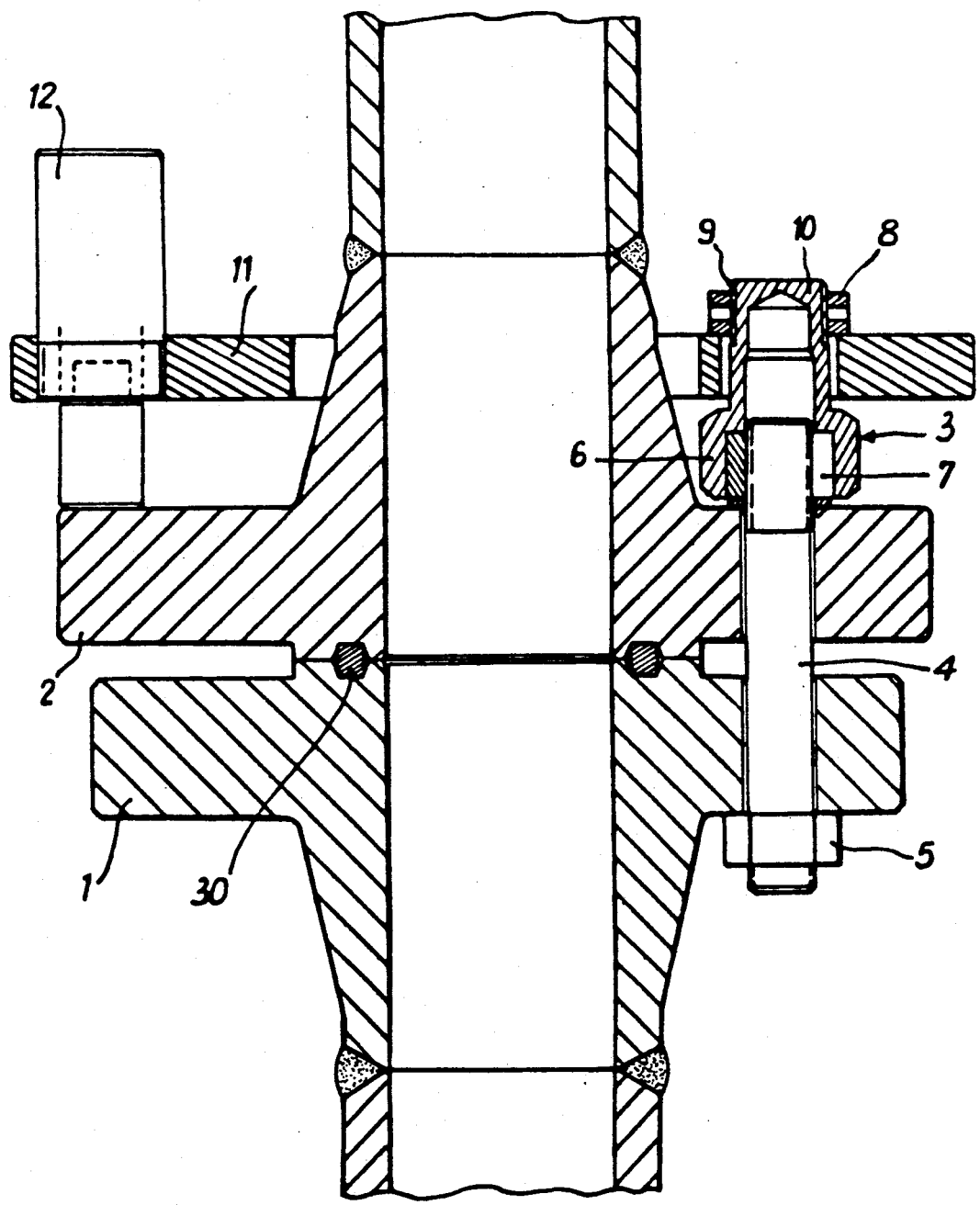
FIG. 1 represents diagrammatically a connector of tubular pipes according to a first embodiment of the invention.

FIG. 1 illustrates a connector of tubular pipes such as those used for the transport of hydrocarbons and with a vertical axis in the example illustrated.

The connector comprises two annular flanges 1 and 2 between which a quick disconnection under load should be able to be made, a plurality of connecting devices 3 described more in detail with reference to FIGS. 2 to 6 being distributed on said flanges 1 and 2. Each connecting device comprises a shaped rod 4, threaded in the example shown, which goes through flange 1 of the upper connector element and is fastened by a corresponding nut 5 to the flange of the other connector element. The connection is provided by locking of a sleeve 6 engaged around a tapped ring forming nut 7 of each connecting device against flange 2. A nut 8 screwed on a thread 9 of free end 10 sleeve 6 secures the sleeve of an annular plate 11 mounted coaxially around the upper connector element. A thrust cylinder 12 is provided to lift plate 11 while resting against flange 2. Advantageously several cylinders could be provided.

It is understood that an actuation of cylinder 12 causes a separation between flange 2 and plate 11 and therefore the movement of sleeves 6 of the various connecting devices as illustrated in FIGS. 2 to 6.

In these figures, the operating principle of a connecting device that can be used in the connector according to the invention has been illustrated.

These connecting devices are known in their principle. An application to the disconnection of a covering structure in an offshore drilling platform is, for example, described in the patent U.S. Pat. No. 4,082,468. In this document, it is a matter of being able to perform an easy disconnection by divers but not as in this invention a disconnection as quick as possible under heavy load.

The connecting device according to the invention comprises an annular ring 7, with an outside cylindrical surface, but which could be slightly conical, and which, in the example shown, consists of assembly of three equal complementary segments 7a, 7b, 7c.

On ring 7, in which the end of a threaded rod 2 is engaged here by screwing, a sleeve designated overall by 6 is engaged with an interference fit. This sleeve 6 comprises a lower part exhibiting a lower bearing surface 13 applied on the periphery of ring 7, and a part of free upper end 10 exhibiting, for example, a threaded outside section 9 and on which can be engaged a nut 8 (FIG. 1) holding sleeve 6 on a structural element to be separated from the structural element to which threaded rod 4 is fastened.

In the example illustrated with a threaded rod and a nut, there is provided a cylindrical pin 14 housed in grooves 15 and 16 of semicircular section of inside wall 13 of the sleeve and of the outside wall of segment 7c of the nut. This cylindrical pin is intended to facilitate the transmission of a locking torque to the nut after shrink-fitting thereon of the sleeve by application of a tool such as a wrench on the nut.

When, as illustrated in FIG. 5, a pull is exerted in the direction indicated by arrow T, there are performed an unshrinking and a movement of sleeve 6 in relation to nut 7 which remains solid with threaded rod 4. When the position illustrated in FIG. 5 is reached, the segments of nut 7 are no longer held on the inside of the recess of sleeve 6, which permits their separation as diagrammed by arrow S in FIG. 4 and a separation of nut 7 from rod 4 which, no longer being held, separates in the direction of arrow R illustrated in FIG. 4.

The connector illustrated in FIG. 7 differs from the one illustrated in FIG. 6 particularly by the fact that each of rings 17 of the connecting devices exhibits an outside surface stepped with a lower part of larger outside diameter 18 and an upper part of reduced outside diameter 19, a set-back 20 thus being made between the two parts. Shrink-fitted sleeve 21 exhibits an inside section shape suited to that of ring 17.

A shaped rod 22, here threaded, solid with a flange 23 is screwed into the ring, here a nut 17, on a part of its length, approximately up to set-back zone 20, while an upper shaped rod 24, here threaded, solid with a flange 25 is screwed into nut 17 until coming approximately opposite the end of rod 22. In this example also, nut 17 is made in three complementary segments. Sleeve 21 is made solid with an annular plate 26 by a nut 27 similar to nut 13 of the preceding embodiment. Also, nuts 28 and 29 make threaded rods 22 and 24 solid with flanges 23 and 25. As in the embodiment of FIG. 1, a seal 30 is provided between the two connector elements.

It is understood that by bringing together plate 26 of flange 25 under the effect of cylinder 12, sleeve 21 lifted by nut 27 slides in relation to nut 17 until its lower end comes into the set-back zone of the outside surface of the nut causing a separation of the segments that make up the nut.

This embodiment makes possible a quick disconnection under heavy load in the case where the load is highly deflected in relation to the longitudinal axis of the connection.

Figure 8:
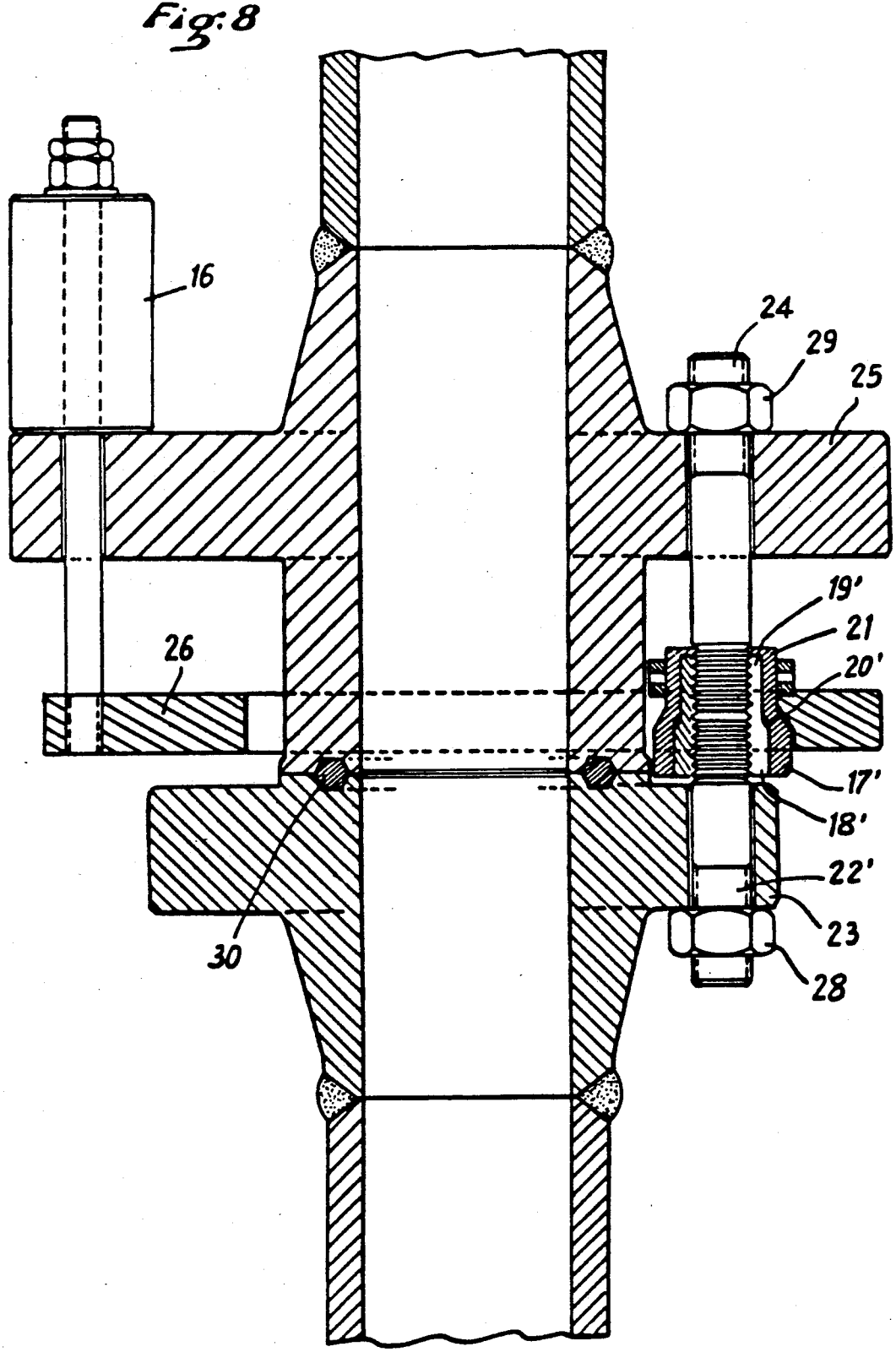
FIG. 8 illustrates a variant of this connector.

The embodiment of FIG. 8 differs from that of FIG. 7 by the fact that each threaded rod 22' and 24' no longer comprises a threading but a denticulation that is, a series of annular ridges or ribs, ring 17' being internally denticulated in a corresponding way. The tops and bottoms of the teeth are located in parallel planes orthogonal to the axis of the ring and rods.

Such a shaping in the form of denticulation can, of course, be used for rod 4 and ring 7 of the embodiment of FIG. 1. The term "serrations as used in the claims below is intended to cover both helical threads and annular denticulations.

In the embodiment of FIGS. 9 and 10, there is provided an annular element in the shape of a stirrup 31 connecting two flanges 32,33 opposite the assembled connector elements. In the example illustrated, the stirrup comprises two parts 34,35 articulated in relation to a part 36, a quick-separation connecting device according to the invention being placed between two opposite flanges 37,38 of parts 34,35. Thus, sleeve 39 is engaged on a nut 40, for example, having three segments inside of which is screwed a threaded rod 41 drawn by a nut 42 against flange 37. The separation of flanges 37,38 and therefore the opening of stirrup 31 and the separation of flanges 32,33 of the connector is assured by a cylinder 43 solid with sleeve 39 and whose rod 44 rests on threaded rod 41.

Figure 11:
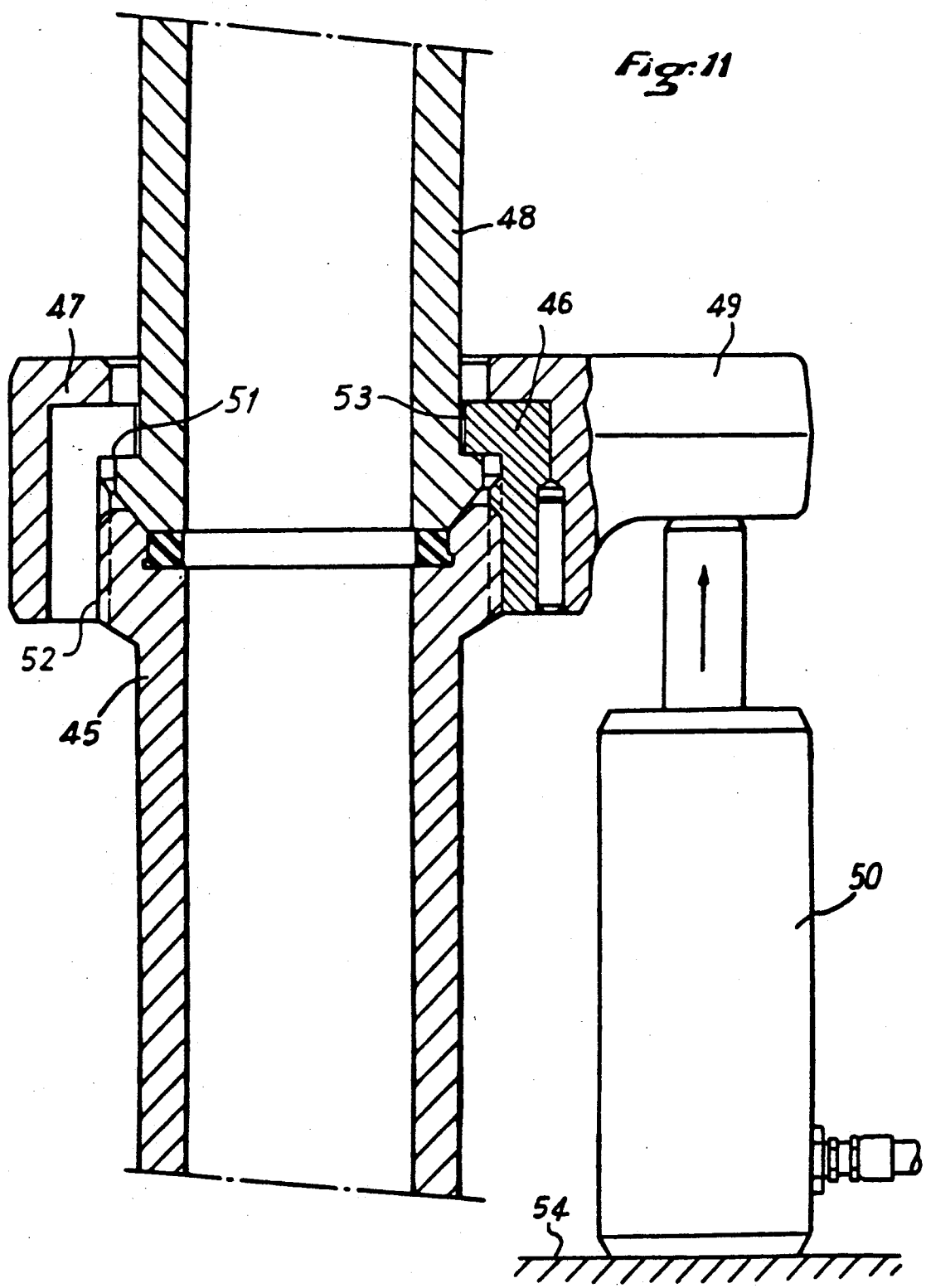

In the embodiment of FIG. 11, a single connecting device is provided whose tubular threaded rod 45 is one of the connected pipes, a nut 46 surrounded by a sleeve 47, being placed around rod 45 and the other pipe 48.

As shown, the upper pipe 48 has a peripheral shoulder 51, while the lower pipe 45 has a threaded periphery 52. The internal flange 53 of nut 46 bears against shoulder 51, while the threaded periphery 52 is engaged by mating internal threads on the nut.

Sleeve 47 comprises a flange 49 on which the rod of a cylinder 50 rests for disconnection.

The platform 54 which supports the body of the hydraulic cylinder may be connected to one of the pipes, directly or indirectly, as in FIG. 9. Other means for moving the sleeve could also used, in place of the cylinder shown.

According to the invention, particularly simple and reliable connectors can be made that can be separated under the effect of a force that is a great deal less than the load brought about by the tension of corresponding rods, for example 15 to 20 times less than this tension.

Thus, for example, with a threaded rod 2 or 22 of dimension M30 with a nut locking torque of 130 m.daN corresponding to a rod tension of 29 tons, an axial force of 1.7 tons suffices to perform the disconnection.

Although the invention has been described in connection with particular embodiments, it is quite obvious that it is in no way limited to them and that numerous variants and modification can be made to it without thereby going outside its scope or its spirit.

I claim:

1. An assembly for interconnecting two flanged pipe ends, the assembly being capable of quickly releasing the pipe ends even when they are under tension, comprising:
   at least one connecting device for holding said ends in position, said connecting device comprising
   a rod having at one end external serrations, and at its other end means for engaging a first one of said pipe flanges,
   a segmented retaining ring comprising at least two separate arcuate segments, each having an internal surface with serrations thereon corresponding to and engageable with serrations on said rod, said ring having an end surface engageable with a second one of said pipe flanges, and
   a sleeve adapted to fit over said ring segments when the segments are assembled around said rod, the sleeve being axially movable from a first position, in which the segments are held together by the sleeve so as to retain said rod between them, to a second position, in which the segments are released to free said rod;
   said assembly further comprising actuating means connected to one of said pipes, and connected to said sleeve, for moving said sleeve from said first position to said second position.

2. An assembly according to claim 1, further comprising an annular plate mounted around one of said pipes for reciprocating movement with respect thereto, and connected to said sleeve and to said actuating means for moving said plate with respect to the pipe connected to said actuating means and thus said sleeve axially with respect to said ring from said first position to said second position.

3. An assembly according to claim 1, wherein the serrations on the rod and the ring are screw threads, the ring serving as a nut into which the threaded rod is screwed.

4. An assembly according to claim 3, wherein both the inside wall of the sleeve and the outside wall of at least one of the segments of the ring have at least one longitudinally extending groove of semicircular section, and further comprising a cylindrical pin placed in said grooves to prevent relative rotation between the sleeve end and the ring, thus enabling one to tighten the nut upon the rod by turning the sleeve.

5. An assembly according to claim 1, wherein the serrations on the rod and the ring are annular teeth.

6. An assembly according to claim 1, wherein the sleeve is force fitted on the annular ring.

7. An assembly according to claim 1, wherein both the outer surface of the ring and the inner surface of the sleeve are cylindrical.

8. An assembly according to claim 1, wherein the ring has a longitudinal stepped outside surface, and said sleeve is correspondingly stepped.

9. An assembly according to claim 1, further comprising a plurality of said connecting devices distributed on said flanged pipe ends.

10. An assembly according to claim 9, wherein the ring has an axially stepped outside surface, and said sleeve is correspondingly stepped.

11. An assembly according to claim 1, wherein said actuating means is a thrust cylinder.

12. An assembly for interconnecting ends of two pipes, one of which is threaded and the other of which has an external shoulder, said assembly being capable of quickly releasing the pipes when they are under tension, comprising:
   a connecting device for holding said pipes in apposition, said connecting device including
   a segmented retaining ring comprising at least two separate arcuate segments, each having a threaded internal surface for engaging said threaded pipe end, and abutment means for engaging the peripheral shoulder of the pipe end having a shoulder,
   a sleeve adapted to fit over said ring and axially movable in relation to it between a first position in which the segments are being held together by the sleeve so as to retain said pipe end between them, and a second position in which the segments are released to free said pipe end, and
   said assembly further comprising actuating means connected to one of said pipes, for moving said sleeve from said position to said second position.

13. An assembly according to claim 12, wherein both the inside wall of the sleeve and the outside wall of the segments of the ring at least one longitudinally extending groove of semicircular section, and futher comprising a cylindrical pin placed in said grooves to prevent relative rotation between the sleeve and the ring, thus enabling one to tighten the nut upon the pipe end by turning the sleeve.

14. An assembly according to claim 12, wherein the sleeve is force fitted on the annular ring.

15. An assembly according to claim 12, wherein both the outer surface of the ring and the inner surface of the sleeve are cylindrical.

16. An assembly according to claim 12, wherein the ring has an axially stepped outside surface, and said sleeve is correspondingly stepped.

17. An assembly for interconnecting two flanged pipe ends, capable of quickly releasing the pipe ends even when they are under tension, comprising:
 at least one connecting device for holding said ends in apposition, said connecting devices including
 two axially aligned rods, each having at one end external serrations and at its other end means for engaging one of said pipe flanges
 a segmented retaining ring, comprising at least two separate arcuate segments, each having an internal surface with serrations thereon corresponding to and engageable with the serrations on both said rods, and
 a sleeve, adapted to fit over said ring segments when the segments are assembled said rods, said sleeve being axially movable from a first position, in which the segments are held together by the sleeves so as to retain said two rods between them, and a second position, in which the segments are released to free said rods from each other; and
 said assembly further comprising actuating means connected to one of said pipes for moving said sleeve from said first position to said second position.

18. An assembly according to claim 17, further comprising an annular plate mounted around one of said pipes for reciprocating movement with respect thereto, and connected to said sleeves and to said actuating means for moving said plate with respect to the pipe connected to said actuating means and thus said sleeve axially with respect to said ring from said first position to said second position.

19. An assembly according to claim 18, wherein the serrations on the rods the ring are screw threads, the ring serving as a nut into which the threaded rods are screwed.

20. An assembly according to claim 19, wherein both the wall of the sleeve and the outside wall of at least one of the segments of said nut have at least one groove of semicircular section, and further comprising a cylindrical pin housed in said opposed grooves to enable one to screw the nut upon the rods by turning the sleeve.

21. An assembly according to claim 17, wherein the serrations on both rods and on the ring are annular teeth.

22. An assembly according to claim 17, wherein the sleeve is force fitted on the annular ring.

23. An assembly according to claim 17, wherein both the outer surface of the ring and inner surfaces of the sleeve are cylindrical.

24. An assembly according to claim 17, further comprising a plurality of said connecting devices distributed on said flanged pipe ends.

25. An assembly according to claim 17, wherein said actuating means is a thrust cylinder.

* * * * *

UNITED STATES PATENT AND TRADEMARK OFFICE
CERTIFICATE OF CORRECTION

PATENT NO.   : 5,108,133
DATED        : April 28, 1992
INVENTOR(S)  : Rene Maloberti It is certified that error appears in the above-indentified patent and that said Letters Patent is hereby corrected as shown below:

On the title page, Item [73] Assignee should be added;

--Coflexip, Paris, France--

Signed and Sealed this

Twenty-ninth Day of March, 1994

*Attest:*

BRUCE LEHMAN

*Attesting Officer*  Commissioner of Patents and Trademarks